(12) United States Patent
Shaouy

(10) Patent No.: US 10,803,409 B2
(45) Date of Patent: *Oct. 13, 2020

(54) SYSTEM AND METHOD FOR PROVIDING AUTOMATIC TASK ASSIGNMENT AND NOTIFICATION

(71) Applicant: INTERNATIONAL BUSINESS MACHINES CORPORATION, Armonk, NY (US)

(72) Inventor: William P. Shaouy, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,429

(22) Filed: Mar. 30, 2018

(65) Prior Publication Data
US 2018/0225618 A1 Aug. 9, 2018

Related U.S. Application Data

(63) Continuation of application No. 15/012,375, filed on Feb. 1, 2016, now Pat. No. 9,984,343, which is a (Continued)

(51) Int. Cl.
*G06Q 10/06* (2012.01)
*G06Q 10/10* (2012.01)

(52) U.S. Cl.
CPC ..... *G06Q 10/063112* (2013.01); *G06Q 10/06* (2013.01); *G06Q 10/063116* (2013.01); *G06Q 10/063118* (2013.01); *G06Q 10/1097* (2013.01)

(58) Field of Classification Search
None
See application file for complete search history.

(56) References Cited

U.S. PATENT DOCUMENTS

| 5,012,409 A | 4/1991 | Fletcher et al. |
| 5,111,391 A | 5/1992 | Fields et al. |

(Continued)

FOREIGN PATENT DOCUMENTS

WO   2000028454   5/2000

OTHER PUBLICATIONS

Todd Bishop P-1 reporter. (May 14, 2007). Dot-Com Survivor Eproject Looking to Make Strides; Software Maker Scores $12 Million in Venture Capital Financing :[Final Edition]. Seattle Post Intelligencer, p. E.1. Retrieved Sep. 22, 2010, from Business Dateline. (Document ID: 1270843581 ).

*Primary Examiner* — Eric W Stamber
*Assistant Examiner* — Alan Torrico-Lopez
(74) *Attorney, Agent, or Firm* — Stephanie Carusillo; Andrew M. Calderon; Roberts Calderon Safran & Cole, P.C.

(57) ABSTRACT

A system and method of managing and prioritizing tasks amongst resources and, more particularly, to a system and method for providing automatic task assignment and notification amongst globally dispersed human resources. The system includes a change of management application configured to store a list of tasks and a task notifier configured to retrieve a list of geographically-dispersed resources and notify selected ones of the geographically-dispersed resources of a priority of completion of one or more tasks retrieved from the change of management application. The system further includes a message application configured to be polled by the task notifier to determine which of the geographically dispersed resources is online or currently working.

2 Claims, 3 Drawing Sheets

Related U.S. Application Data continuation of application No. 11/849,738, filed on Sep. 4, 2007, now Pat. No. 9,953,282.

(56) References Cited

U.S. PATENT DOCUMENTS

| | | | |
|---|---|---|---|
| 5,117,353 | A | 5/1992 | Stipanovich et al. |
| 5,278,976 | A | 1/1994 | Wu |
| 5,826,239 | A | 10/1998 | Du et al. |
| 5,848,271 | A * | 12/1998 | Caruso ............... G06Q 10/10 712/220 |
| 5,960,404 | A | 9/1999 | Chaar et al. |
| 6,101,481 | A | 8/2000 | Miller |
| 6,308,163 | B1 | 10/2001 | Du et al. |
| 6,415,259 | B1 | 7/2002 | Wolfinger et al. |
| 6,445,968 | B1 | 9/2002 | Jalla |
| 6,810,383 | B1 | 10/2004 | Loveland |
| 6,868,413 | B1 | 3/2005 | Grindrod et al. |
| 7,071,041 | B2 | 7/2006 | Yamazaki et al. |
| 7,155,400 | B1 * | 12/2006 | Jilk ................... G06Q 10/06 705/7.14 |
| 7,263,183 | B1 * | 8/2007 | Klein ............... H04M 3/42374 379/265.09 |
| 7,330,822 | B1 | 2/2008 | Robson et al. |
| 7,406,515 | B1 | 7/2008 | Joyce et al. |
| 7,769,617 | B2 | 8/2010 | Iwasaki et al. |
| 7,774,742 | B2 | 8/2010 | Gupta et al. |
| 7,870,535 | B2 | 1/2011 | Rippert et al. |
| 2002/0029161 | A1 | 3/2002 | Brodersen et al. |
| 2003/0009530 | A1 | 1/2003 | Philonenko et al. |
| 2003/0028410 | A1 | 2/2003 | House et al. |
| 2003/0149598 | A1 | 8/2003 | Santoso et al. |
| 2003/0158745 | A1 | 8/2003 | Katz et al. |
| 2004/0021686 | A1 * | 2/2004 | Barberis ............... G06Q 10/10 715/738 |
| 2004/0030992 | A1 | 2/2004 | Moisa et al. |
| 2004/0093237 | A1 * | 5/2004 | Redding ............... G06Q 50/22 705/2 |
| 2004/0093351 | A1 | 5/2004 | Lee et al. |
| 2004/0111313 | A1 | 6/2004 | Ingman et al. |
| 2004/0117759 | A1 | 6/2004 | Rippert et al. |
| 2004/0138939 | A1 | 7/2004 | Theiler |
| 2004/0153354 | A1 | 8/2004 | Nonaka et al. |
| 2004/0243444 | A1 * | 12/2004 | Steusloff ............... G06F 3/002 705/2 |
| 2004/0268349 | A1 | 12/2004 | Ramakrishnan et al. |
| 2005/0027578 | A1 | 2/2005 | Chambers et al. |
| 2005/0049973 | A1 | 3/2005 | Read et al. |
| 2005/0055697 | A1 | 3/2005 | Buco et al. |
| 2005/0071426 | A1 | 3/2005 | Shah et al. |
| 2005/0165631 | A1 * | 7/2005 | Horvitz ........... G06Q 10/063116 705/7.16 |
| 2005/0209902 | A1 * | 9/2005 | Iwasaki ........... G06Q 10/063112 705/7.26 |
| 2005/0229151 | A1 | 10/2005 | Gupta et al. |
| 2006/0053043 | A1 | 3/2006 | Clarke |
| 2006/0070020 | A1 | 3/2006 | Puttaswamy et al. |
| 2006/0112371 | A1 | 5/2006 | Oikawa et al. |
| 2006/0173785 | A1 | 8/2006 | Behbehani |
| 2006/0277547 | A1 | 12/2006 | Abe |
| 2007/0100981 | A1 | 5/2007 | Adamczyk et al. |
| 2008/0313024 | A1 | 12/2008 | Kunichika et al. |
| 2009/0112677 | A1 | 4/2009 | Rhett |

* cited by examiner

SYSTEM AND METHOD FOR PROVIDING AUTOMATIC TASK ASSIGNMENT AND NOTIFICATION

FIELD OF THE INVENTION

The invention generally relates to a system and method of managing and prioritizing tasks amongst resources and, more particularly, to a system and method for providing automatic task assignment and notification amongst globally dispersed human resources.

BACKGROUND OF THE INVENTION

Global developments, both technological and economic, have led many organizations to diversify their workforce throughout the world. For example, technology such as computer networking has made it feasible for companies or other organizations to employee people regardless of geographic boundaries. That is, technologies have allowed employees to be increasingly dispersed in time, place, and organizational affiliation. In this way, as labor markets are becoming tighter and supply-driven, it is possible to find more qualified personnel, without the need to have a physical facility at such locations.

However, becoming ever more dispersed, both technologically as well as geographically, poses significant challenges to management. By way of example, it becomes increasingly more difficult for management to coordinate workflow and assignments for projects. This is a significant challenge when employees dispersed amongst different locations are assigned to a single project. This is even more challenging when these employees (team members) are dispersed amongst different time zones, some being 12 or more hours different.

A project manager is tasked with the coordination of the project by first assembling a team and then assigning the team members specific tasks that need to be accomplished to complete the project. This includes assessing the skill set and level of skill of all team members, the time that each team member is projected to work, the sequence of tasks that are required to complete the task, etc. As such, the project manager is thus tasked with leading the planning and the development of all project deliverables. The project manager is also thus responsible for managing the budget and work plan and all project management procedures such as, for example, scope management, issues management, risk management, etc.

Thus, as can be imagined, a project team dispersed amongst many different time zones has many challenges to overcome in performing their work. This includes the coordination and collaboration of projects, amongst themselves, and the coordination and assignment of workflow by the project manager. The latter of which becomes very problematic when a project requires certain tasks to be performed in a specific sequence. So, for example, it is the responsibility of the project manager to ensure that a team member work and complete a first task, in an earlier time zone, prior to another team member undertaking a subsequently required task in a later time zone.

It is also important for the project manager to communicate the specific tasks that require completion, and their time frame for completion, amongst all of the team members. But this becomes problematic when certain team members, in different time zones, are not currently working since their workday has ended or not yet started.

Accordingly, there exists a need in the art to overcome the deficiencies and limitations described hereinabove.

SUMMARY OF THE INVENTION

In a first aspect of the invention, a system comprises a change of management application configured to store a list of tasks and a task notifier configured to retrieve a list of geographically-dispersed resources and notify selected ones of the geographically-dispersed resources of a priority of completion of one or more tasks retrieved from the change of management application. The system further includes a message application configured to be polled by the task notifier to determine which of the geographically dispersed resources is at least one of online and currently working.

In another aspect of the invention, a method for prioritizing tasks comprises providing a computer infrastructure being operable to: store a list of tasks, geographically-dispersed resources and skills; and retrieve the geographically-dispersed resources which match with the skills of retrieved tasks and notify selected ones of the geographically-dispersed resources of a priority of completion of the retrieved tasks.

In another aspect of the invention, a method comprises polling a list of geographically dispersed resources to determine which geographically dispersed resources are online and/or currently working. The method further includes retrieving a latest list of tasks whose required skills is not null and prioritizing each of the retrieved tasks for selected ones of the geographically dispersed resources.

In another aspect of the invention, a computer program product comprising a computer usable medium having readable program code embodied in the medium is provided. The computer program product includes at least one component to perform the functions of the computer infrastructure.

DETAILED DESCRIPTION OF EMBODIMENTS OF THE INVENTION

The invention generally relates to a system and method of managing and prioritizing tasks amongst resources and, more particularly, to a system and method for providing automatic task assignment and notification amongst globally dispersed human resources. More specifically, in embodiments, the system and method of the invention contemplates an architecture that performs functions of a project manager. For example, in one aspect of the invention, the system and method is configured to automatically prioritize tasks for human resources globally dispersed among time zones, and notify those human resources, e.g., team members, that they "own" new tasks. The need for this capability has become greater with the advent of globally dispersed project teams.

The advantage of virtual project teams, which are coordinated and prioritized by the automatic task assignment and notification method and system, is diverse. For example, the system and method of the invention provides flexibility to bring together members from diverse contexts for short and long term endeavors. The system and method of the invention also bridges many contrasting requirements, especially the transferability of knowledge to and from the project.

System Environment

Figure 1:
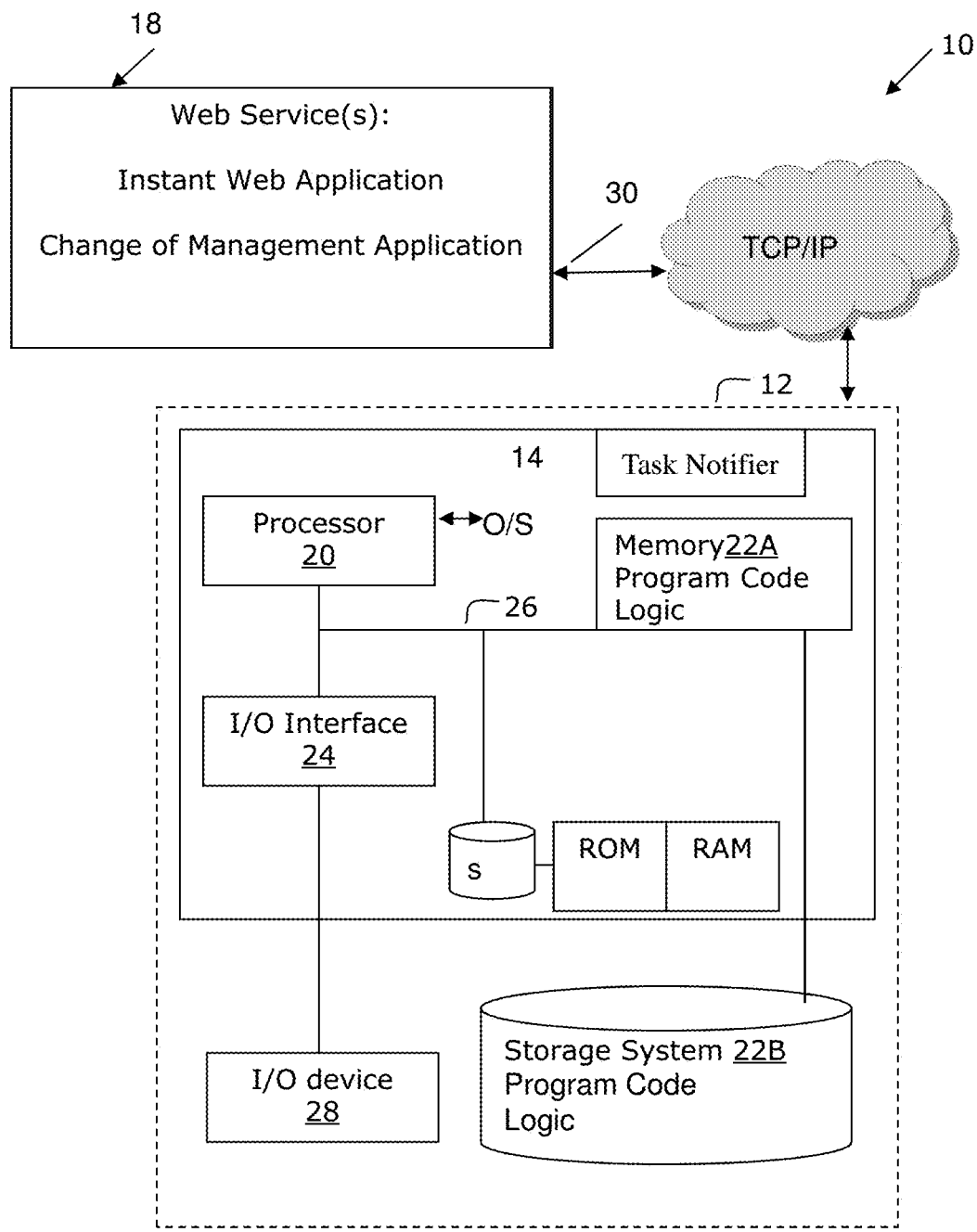
FIG. 1 shows an illustrative environment in accordance with the invention.

FIG. 1 shows an illustrative environment 10 for managing the processes in accordance with the invention. The illustrative environment may be a server or a user workstation, for example. The environment 10 includes a computer infrastructure 12 having a computing device 14 (e.g., including a Task Notifier). More specifically, the computing device 14 includes a Task Notifier that performs several functions including, for example, retrieving a list of geographically-dispersed resources from a Resources Table stored in storage 22B, e.g., Task-Resource Database. In embodiments, the Task-Resource Database 22B contains very little information, and is used as a pointer to other storage areas. This makes the Task-Resource Database very flexible and lightweight.

In embodiments, the Task Notifier is configured to poll an Instant Message Application (or other application) through a web service interface 18 to determine which geographically dispersed resources are online and/or are currently working. The web service interface 18 may also interface with a Change of Management Application, as discussed below. In addition, the Task Notifier is configured to retrieve the latest list of tasks from a Tasks Table, as well as skills of team members from the Resources Table, both of which may be stored in the Resource Database 22B. In embodiments, using the information obtained in or from the Resource Database 22B, the Task Notifier is capable of matching and prioritizing tasks, amongst globally dispersed team members (also referred to as geographically dispersed resources) in the absence of a project manager and/or tech leader.

In embodiments, the Task Notifier includes executable code, which may be stored temporarily or permanently in a memory 22A. The executable code may be used to prioritize tasks and notify resources (e.g., team members) of the prioritized tasks. The executable code, e.g., program code, may implement a rules engine that uses programmable business logic to prioritize the tasks and notify the team members about the tasks they are assigned, as assisted by the Task-Resource Database 22B.

Still referring to FIG. 1, the memory 22A can include local memory employed during actual execution of program code, bulk storage, and cache memories which provide temporary storage of at least some program code in order to reduce the number of times code must be retrieved from bulk storage during execution. The computer infrastructure 12 further includes a processor 20, an input/output (I/O) interface 24, a bus 26, Storage "S", ROM, RAM and an external I/O device/resource 28.

The computer infrastructure 12 also includes an operating system O/S, which may be any operating system. The external I/O device/resource 28 may be a keyboard, display, pointing device, or any device that enables the computer infrastructure 12 to communicate with one or more other computing devices using any type of communications link 30. The communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

The processor 20 executes the computer program code and logic of the system and method of the invention, e.g., the Task Notifier, which is stored in the memory 22A. While executing the computer program code, etc., the processor 20 can read and/or write data to/from the memory 22A, storage system 22B, and/or I/O interface 24. The bus 26 provides a communications link between each of the components in the computing device 14.

Architecture of Embodiments of the Invention

Figure 2:
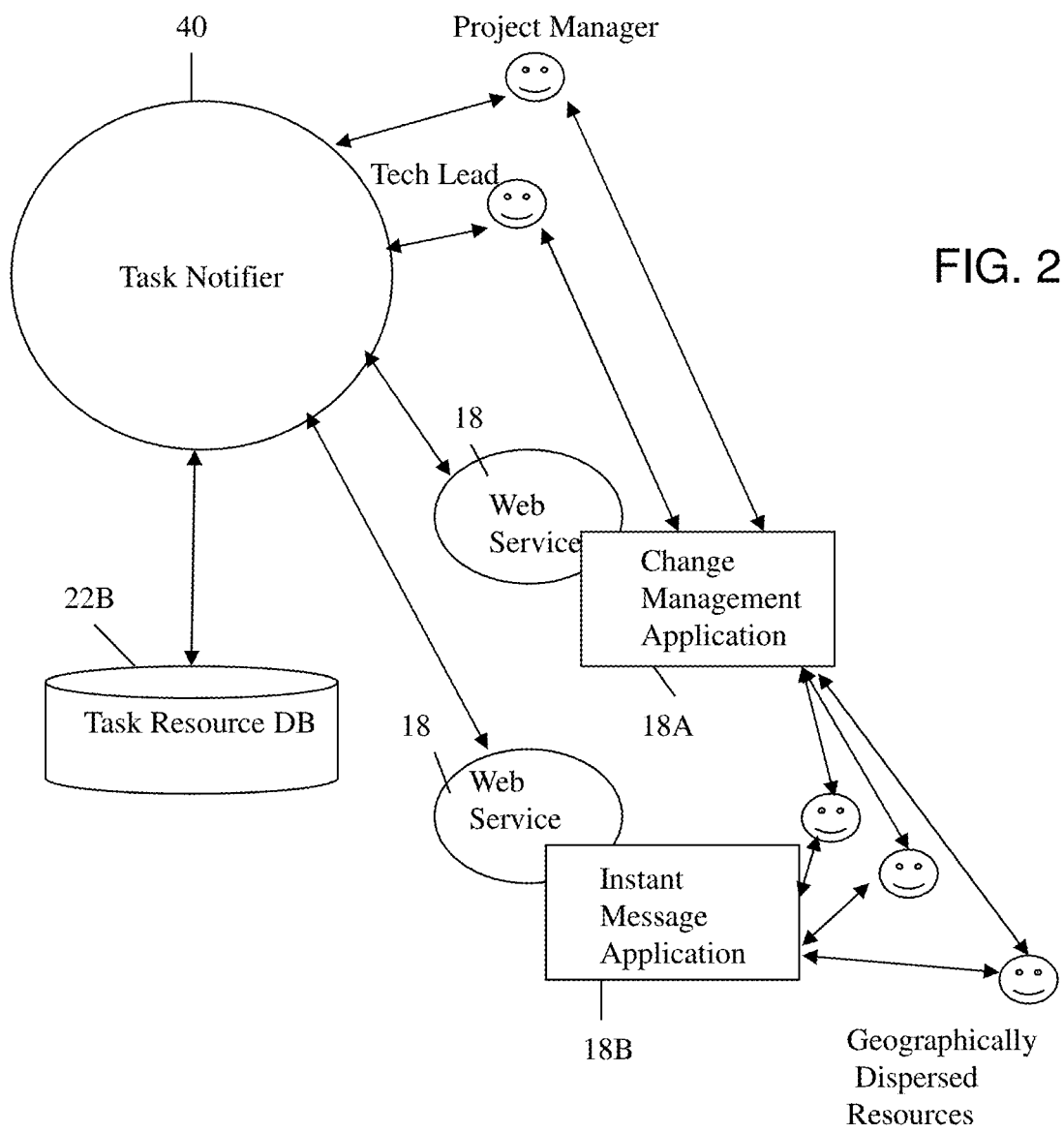
FIG. 2 shows an architecture in accordance with an aspect of the invention.

FIG. 2 shows an architecture in accordance with an aspect of the invention. More specifically, the architecture includes a Task Notifier 40 which is a component containing a rules engine that uses programmable business logic to prioritize tasks and notify team members about the assigned tasks. In embodiments, the Task Notifier 40 acts as a project manager.

The Task Notifier 40 retrieves information from the Task-Resource Database 22B, including tasks, pointers to team members, skills required for the tasks and skills of team members, amongst other features. The Task-Resource Database 22B contains the Tasks Table and Resources Table, which provide the pertinent information to the Task Notifier 40. The tables may be in column format as shown below.

| Tasks Table | |
|---|---|
| Task ID | string |
| Priority | integer |
| Required Skills | comma-delineated string of skills |

| Resources Table | |
|---|---|
| Name of team member | string |
| Change Management Application User ID | string |
| Instant Message Application User ID (or other ID, e.g., email, facsimile, etc.) | string |
| Skills of Team Members | comma-delineated string of skills |

The Tasks Table, in one illustrative implementation, includes a Task ID (e.g., in the form of a string), Priority (e.g., in the form of an integer) and Required Skills (e.g., in the form of a comma-delineated string). By way of one non-limiting example, the Task ID may be a pointer pointing to a "Change of Management Application." The Priority may be any integer, for example, which designates a priority of a specific task. The required skills include one or a set of skills, which are required for a specific task, e.g., JAVA, XML, etc.

The Resources Table, on the other hand, includes, for example, names of team members (e.g., in the form of a string), a "Change Management Application User ID" (e.g., in the form of a string), an "Instant Message Application User ID" or other type of ID (e.g., in the form of a string) and a list of skills of each team member (e.g., in the form of a comma-delineated string). By way of one non-limiting example, the "Change Management Application User ID" may be a user ID to gain access to the Change Management Application. The "Instant Message Application User ID" may be a user ID to gain access to the Instant Message Application. In other embodiments, the User ID may be associated with other types of applications such as, for example, email applications. The skills are a list of one or more skills of team member(s) (e.g., JAVA, XML, etc.), which may be populated by the team members, tech leader or other person(s) familiar with the skills of the team members.

Still referring to FIG. 2, a Project Manager (or equivalent) creates or modifies tasks in a Change Management Application (e.g., Clearquest®) 18A. (Clearquest is a registered trademark of IBM Corporation, in the U.S. and throughout the world.) Clearquest® provides a robust Configuration Management and Change Request Management solutions for the administration of tasks.

The Project Manager may assign a priority score (some tools use the term "severity") on a numerical or other scale, e.g., 1 through 4 for each task (often expressed as a "feature" or "defect"). In embodiments, all tasks reside in the Change Management Application 18A.

Additionally, the Project Manager is in communication with the Task Notifier 40, which, amongst other features, allows the Project Manager to notify the Task Notifier 40 of his/her absence. The Project Manager (or equivalent) may modify or add tasks in the Change Management Application 18A, via an optional web service.

In embodiments, a low-priority thread of the Task Notifier 40 uses an infinite loop to poll the Change Management Application 18A for its latest list of tasks which are yet to be started. If any unstarted task does not have a corresponding task in the Tasks Table of the Task-Resource Database 22B, the Task Notifier 40 is configured to add rows for those tasks in the Tasks Table. Then, for each of these rows, the Task Notifier 40 sends an instant message and/or email (or other notification) to the Tech Lead prompting the Tech Lead (or other user) to complete the "Required Skills" column in the Tasks Table, for each notified task. The Tech Lead may receive the modified or new tasks from the Change Management Application 18A via a web service.

In further embodiments, geographically dispersed team members (e.g., resources) will receive new or modified tasks and corresponding priorities for such tasks from the Task Notifier 40, via an Instant Message Application 18B. A web service may be an interface between the Instant Message Application 18B and the Task Notifier 40. In further embodiments, the system and method of the invention contemplates that the Task Notifier 40 may notify the geographically dispersed team member of the modified or new tasks (and priorities thereof), via other mechanisms such as email or facsimile, to name a few.

The team members may also provide their skills by populating the "skills" column in the Resources Table. In further embodiments, the Tech Lead may populate the "skills" column in the Resources Table, with the skills of each team member. Once notified of the new task, the team members may retrieve the assigned tasks from the Change Management Application 18A.

Example of Operation

Figure 3:
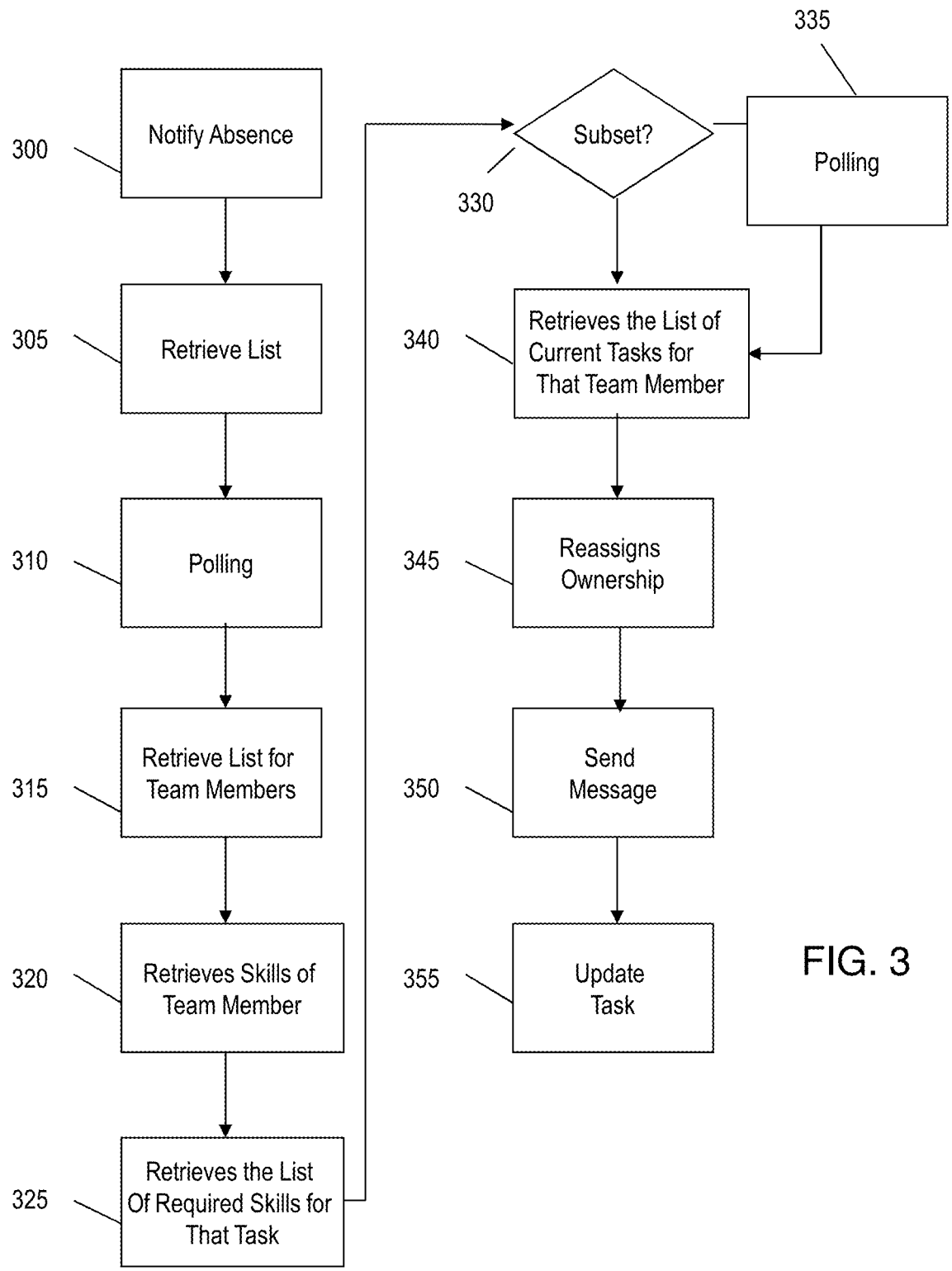
FIG. 3 is a flow-chart of processing steps implementing aspects of the invention.

FIG. 3 is a flow diagram implementing steps of the invention, which may be implemented in the environment of FIG. 1. FIG. 3 may equally represent a high-level block diagram of the invention. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In FIG. 3, at step 300, the Task Notifier will be notified of the absence of the Project Manager. The Project Manager may, in embodiments, provide this notification when there is a planned absence such as logging off for the evening. At step 305, the Task Notifier retrieves a list of all geographically dispersed resources from the Resources Table in the Task-Resource Database.

At step 310, the Task Notifier polls the Instant Message Application or other application (e.g., via a web service) to determine which geographically dispersed resources are online and/or currently working. At step 315, for each resource (team member) on-line (or working), the Task Notifier retrieves the latest list of tasks from the Tasks Table whose Required Skills column is not null (e.g., a column that has not been completed), and uses its rules engine to sort them by priority.

In one embodiment, the rules engine sorts the tasks in priority from highest to lowest; although, it is contemplated by the invention that the rules engine may prioritize the tasks from lowest to highest. In embodiments, the rules engine comprises a high level code, which allows the Project Manager to update the rules engine at the time of creating, or modifying a task. This may include assigning a higher or lower priority to a task.

At step 320, the Task Notifier retrieves the skills of a team member from the Resources Table. For each task in the retrieved subset of tasks, the Task Notifier retrieves the list of required skills for that task, at step 325. At step 330, a determination is made as to whether the required skills are a subset of the skills of a team member. As should be understood to those of skill in the art, a subset may include an identical match between the required skills and the skill set of a team member. If there is no match, then at step 335, the system will continue to poll the Resources Table until a skill set is matched.

Once a subset is found, at step 340, the Task Notifier retrieves the list of current tasks for that team member from the Change Management Application. If all those tasks are lower in priority than the new task, the Task Notifier reassigns ownership of the new or modified task to the team member, at step 345. In alternate embodiments, the Task Notifier can reassign priority to any current task owned by a team member, regardless of its current priority. At step 350, the Task Notifier sends a message, e.g., Instant Message and/or email, to the team member, notifying the team member of the new or modified task, and its priority. In this step, the team member is notified that they "own" the new or modified task. At step 355, when the team member finishes the assigned task (or any task), the task is updated as normal. In embodiments, the team member may update the status of the task. The steps 310-355 may continue in an infinite loop.

Thus, in embodiments, the system and method of the invention may provide, amongst other features:
- A technology for automatically performing functions of a project manager, in the absence of the project manager;
- An execution flow for automatically prioritizing tasks for human resources globally dispersed among time zones, and notifying those people that they own new tasks;
- A Task Notifier application which includes business logic and which integrates a change management application and an instant messaging application; and
- A rules engine for prioritizing tasks.

While the invention has been described in terms of embodiments, those skilled in the art will recognize that the invention can be practiced with modifications and in the spirit and scope of the appended claims.

What is claimed is:

1. A computer program product comprising a non-transitory computer readable storage medium having program instructions embodied therewith, the program instructions executable by a computing device to cause the computing device to:
   retrieve a list of geographically-dispersed resources;
   retrieve a list of tasks including a plurality of tasks from a task table accessible by the computing device, wherein:
      for each of the plurality of tasks, the task table includes an entry corresponding to a Task ID, a priority, and required skills;
      the Task ID is a pointer pointing to a change of management application, wherein the Task ID of the task table is in a form of a string, the priority of the task table is in the form of an integer and the required skills of the task table is in the form of a comma-delineated string of skills;
      the priority value designates a priority of a respective one of the plurality of tasks; and
      the required skills are a set of skills that are required for a respective one of the plurality of tasks;
   create new tasks and modify existing tasks through a web service;
   utilize an infinite loop to poll the change of managements application for a latest list of the newly created and modified tasks which are yet to be started and are added to the change of management application by a web service interface of the web service;
   send an instant message to a leader of the geographically-dispersed resources that a column for required skills needs to be completed for the newly created and modified tasks;
   add the newly created and modified tasks to the task table and associate each of the newly created and modified tasks with a plurality of required skills from the completed column for required skills;
   add rows in the tasks table to account for any unstarted task not having a corresponding task in the task table, wherein the computer program product includes at least one component configured to add information for the unstarted task that does not have the corresponding task in the task table;
   poll a message application to determine which of the geographically-dispersed resources is online and currently working, wherein the message application is an instant message application polled through the web service interface;
   sort priority for the newly created and modified tasks in response to determining the column for required skills is not null;
   prioritize the plurality of tasks in the list of tasks using a rules engine;
   reassign priority to any current tasks owned by the geographically-dispersed resources;
   reassign ownership of the new and modified tasks which have higher priority than all current tasks owned by a member of the geographically-dispersed resources to the member of the geographically-dispersed resources;
   notify a first member of the geographically-dispersed resources about newly assigned tasks using the rules engine, wherein the rules engine uses programmable business logic to prioritize the plurality of tasks and notify by sending a message by email or facsimile or Instant Message to the first member of the geographically-dispersed resources about newly assigned tasks, wherein the message includes a priority of the newly assigned tasks;
   enable a manager to update the rules engine at the time of the newly created and modified tasks to prioritize the newly created and modified tasks from highest to lowest;
   update a status of the newly created and modified tasks; and
   notify of the absence of the manager to the rules engine when the absence is planned;
   wherein a resources table lists the geographically-dispersed resources and is comprised of names of the geographically-dispersed resources, Change Management Application User IDs of the geographically-dispersed resources, Instant Message Application User IDs of the geographically-dispersed resources and skill sets of the geographically-dispersed resources,
   wherein the resources table associates each of the geographically-dispersed resources with a respective plurality of skills,
   wherein the resources table is stored in a database and is used as a pointer to other storage areas,
   wherein the web service interface interfaces with the change of management application in order for the computing device to communicate therewith,
   wherein the names, the Change Management Application User IDs and the Instant Message Application User IDs are in a form of a string,
   wherein the skill sets are in a form of a comma-delineated string,
   wherein the list of geographically-dispersed resources is retrieved from the resources table, and
   wherein the required skills are populated by the geographically-dispersed resources.

2. A system comprising:
   a CPU, a computer readable memory and a computer readable storage medium associated with a computing device;
   program instructions to retrieve a list of geographically-dispersed resources;
   program instructions to retrieve a list of tasks including a plurality of tasks from a task table accessible by the computing device, wherein:

for each of the plurality of tasks, the task table includes an entry corresponding to a Task ID, a priority, and required skills;

the Task ID is a pointer pointing to a change of management application;

the priority value designates a priority of a respective one of the plurality of the tasks; and the required skills are a set of skills that are required for a respective one of the plurality of the tasks;

program instructions to continue polling a resources table for a match between the required skills and a skill set of a geographically-dispersed resource;

program instructions to create new tasks and modify existing tasks through a web service;

program instructions to utilize an infinite loop to poll the change of managements application for a latest list of the newly created and modified tasks which are yet to be started and are added to the change of management application by a web service interface of the web service;

send an instant message and an email to a leader of the geographically-dispersed resources that a column for required skills needs to be completed for the newly created and modified tasks;

program instructions to add the newly created and modified task to the task table and associate each of the newly created and modified tasks with a plurality of required skills from the completed column for required skills;

program instructions to determine which geographically dispersed resources are online and currently working;

in response to determining the column for required skills is not null, program instructions to sort priority for the newly created and modified tasks;

program instructions to prioritize the plurality of tasks in the list of tasks using a rules engine;

program instructions to reassign priority to any current tasks owned by the geographically-dispersed resources;

program instructions to reassign ownership of the new and modified tasks which have higher priority than all current tasks owned by a member of the geographically-dispersed resources to the member of the geographically-dispersed resources;

program instructions to notify a first member of the geographically-dispersed resources which is online and currently working about newly assigned tasks using the rules engine;

program instructions to enable a manager to update the rules engine at the time of the newly created and modified tasks to prioritize the newly created and modified tasks from highest to lowest;

program instructions to prioritize a new task or tasks assigned to the selected ones of the geographically-dispersed resources with a current task, program instructions to poll a message application to determine which of the geographically-dispersed resources is online and currently working, wherein the message application is an instant message application polled through a web service interface;

program instructions to add rows in the tasks table to account for any unstarted task not having a corresponding task in the task table;

program instructions to send the instant message and the email to the leader of the geographically-dispersed resources for each task in each column in the task table to have the required skills completed; and program instructions to notify of the absence of the manager to the rules engine, wherein the resources table is comprised of names of the geographically-dispersed resources, Change Management Application User IDs of the geographically-dispersed resources, Instant Message Application User IDs of the geographically-dispersed resources and skill sets of the geographically-dispersed resources, wherein the names, the Change Management Application User IDs and the Instant Message Application User IDs are in the form of a string and the skill sets are in a form of a comma-delineated string, wherein the list of geographically-dispersed resources is retrieved from the resources table, the Task ID in the task table is a string and the priority in the task table is an integer, and wherein the web service interface interfaces with a change of management application in order for the processor to communicate therewith.

\* \* \* \* \*